US010313176B2

(12) United States Patent
Yamaguchi et al.

(10) Patent No.: US 10,313,176 B2
(45) Date of Patent: Jun. 4, 2019

(54) INFORMATION PROCESSING DEVICE, INFORMATION PROCESSING SYSTEM, AND NON-TRANSITORY COMPUTER READABLE MEDIUM

(71) Applicant: FUJI XEROX CO., LTD., Tokyo (JP)

(72) Inventors: Hiroshi Yamaguchi, Kanagawa (JP); Kengo Tokuchi, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 153 days.

(21) Appl. No.: 15/134,503

(22) Filed: Apr. 21, 2016

(65) Prior Publication Data

US 2017/0126467 A1    May 4, 2017

(30) Foreign Application Priority Data

Nov. 2, 2015   (JP) .................. 2015-215481

(51) Int. Cl.
*H04L 29/06* (2006.01)
*H04L 12/58* (2006.01)

(52) U.S. Cl.
CPC .... *H04L 29/0687* (2013.01); *H04L 29/06904* (2013.01); *H04L 51/08* (2013.01); *H04L 51/12* (2013.01); *H04L 51/24* (2013.01); *H04L 51/30* (2013.01); *H04L 63/126* (2013.01); *H04L 63/1466* (2013.01)

(58) Field of Classification Search
CPC . H04L 29/0687; H04L 51/30; H04L 63/1466; H04L 63/126; H04L 51/24; H04L 51/12; H04L 29/06904; H04L 51/08
See application file for complete search history.

(56) References Cited

U.S. PATENT DOCUMENTS

RE42,166 E  *  2/2011  Oya ................... G03G 15/5075
                                                     702/182
8,224,913 B2 *  7/2012  Tomkow .............. G06Q 10/107
                                                     709/206
8,234,343 B2 *  7/2012  Otaki .................. G06Q 10/107
                                                     709/206

(Continued)

FOREIGN PATENT DOCUMENTS

JP   2002-84310 A    3/2002
JP   2003-258795 A   9/2003

(Continued)

OTHER PUBLICATIONS

Notification of Reasons for Refusal for Japanese Patent Application No. 2015-215481, dated Feb. 23, 2016.

*Primary Examiner* — Uzma Alam
(74) *Attorney, Agent, or Firm* — Sughrue Mion, PLLC

(57) ABSTRACT

An information processing device includes an email transmission unit, a memory, and a transmission unit. The email transmission unit transmits an email with an attached image. The memory stores a transmission history including an information identifier of information indicating that the email has been transmitted. The transmission unit transmits, to an external device, transmission-check-response information indicating that transmission has occurred if the transmission history includes an information identifier included in transmission-check-request information received from the external device.

15 Claims, 13 Drawing Sheets

(56) References Cited

U.S. PATENT DOCUMENTS

| | | | |
|---|---|---|---|
| 8,265,667 B2* | 9/2012 | Lee | H04W 4/12 |
| | | | 370/428 |
| 8,312,501 B2* | 11/2012 | Yoshikawa | H04H 20/57 |
| | | | 709/206 |
| 9,338,119 B2* | 5/2016 | Faynberg | H04L 51/30 |
| 9,596,194 B2* | 3/2017 | Tomkow | H04L 51/30 |
| 2004/0199592 A1* | 10/2004 | Gould | H04L 51/12 |
| | | | 709/206 |
| 2007/0067277 A1* | 3/2007 | Ahn | G06F 16/90328 |
| 2010/0192064 A1* | 7/2010 | Beppu | G06Q 30/02 |
| | | | 715/710 |
| 2011/0119370 A1* | 5/2011 | Huang | H04L 43/14 |
| | | | 709/224 |
| 2011/0202608 A1* | 8/2011 | Nassar | G06Q 10/107 |
| | | | 709/206 |
| 2011/0231502 A1 | 9/2011 | Umeshima et al. | |
| 2012/0303725 A1* | 11/2012 | Sato | H04L 51/14 |
| | | | 709/206 |
| 2013/0173731 A1* | 7/2013 | Katsuki | H04M 1/72555 |
| | | | 709/206 |

FOREIGN PATENT DOCUMENTS

| | | |
|---|---|---|
| JP | 2007-317113 A | 12/2007 |
| JP | 2008-47960 A | 2/2008 |
| JP | 2009-505485 A | 2/2009 |
| JP | 2010-61406 A | 3/2010 |
| WO | 2007/021260 A1 | 2/2007 |

* cited by examiner

1000

| | | |
|---|---|---|
| 1005 | Return-Path | |
| 1010 | X-Original-To | |
| 1015 | Delivered-To | |
| 1020 | Received | |
| 1025 | Message-ID | |
| 1030 | From | |
| 1035 | To | |
| 1040 | Reply-To | |
| 1045 | Subject | |
| 1050 | Date | |
| 1055 | MIME-Version | |
| 1060 | Content-Type | |
| 1065 | Content-Transfer-Encoding | |
| 1070 | X-Mailer | |

| | |
|---|---|
| 1105 — EMAIL ID | |
| 1110 — SENDING DATE AND TIME | |
| 1115 — SENDER | |
| 1120 — EMAIL ADDRESS | |
| 1125 — NUMBER OF ATTACHED FILES | |
| 1130 — ATTACHED FILE ID | |
| 1135 — ATTACHED FILE NAME | |
| 1140 — ATTACHED FILE TYPE | |
| 1145 — ATTACHED FILE CREATION DATE AND TIME | |
| 1150 — ATTACHED FILE SCANNING DATE AND TIME | |
| 1155 — ATTACHED FILE CAPACITY | |
| 1160 — SCAN INSTRUCTOR | |
| ⋮ | ⋮ |

| DEVICE ID (1210) | EMAIL ADDRESS (1220) | IP ADDRESS (1230) |
|---|---|---|
|  |  |  |

| REJECTED ID (1310) | EMAIL ADDRESS (1320) | IP ADDRESS (1330) | REGISTRATION DATE AND TIME (1340) |
|---|---|---|---|
|  |  |  |  |

| AUTHORIZED ID (1410) | EMAIL ADDRESS (1420) | USER NAME (1430) |
|---|---|---|
|  |  |  |

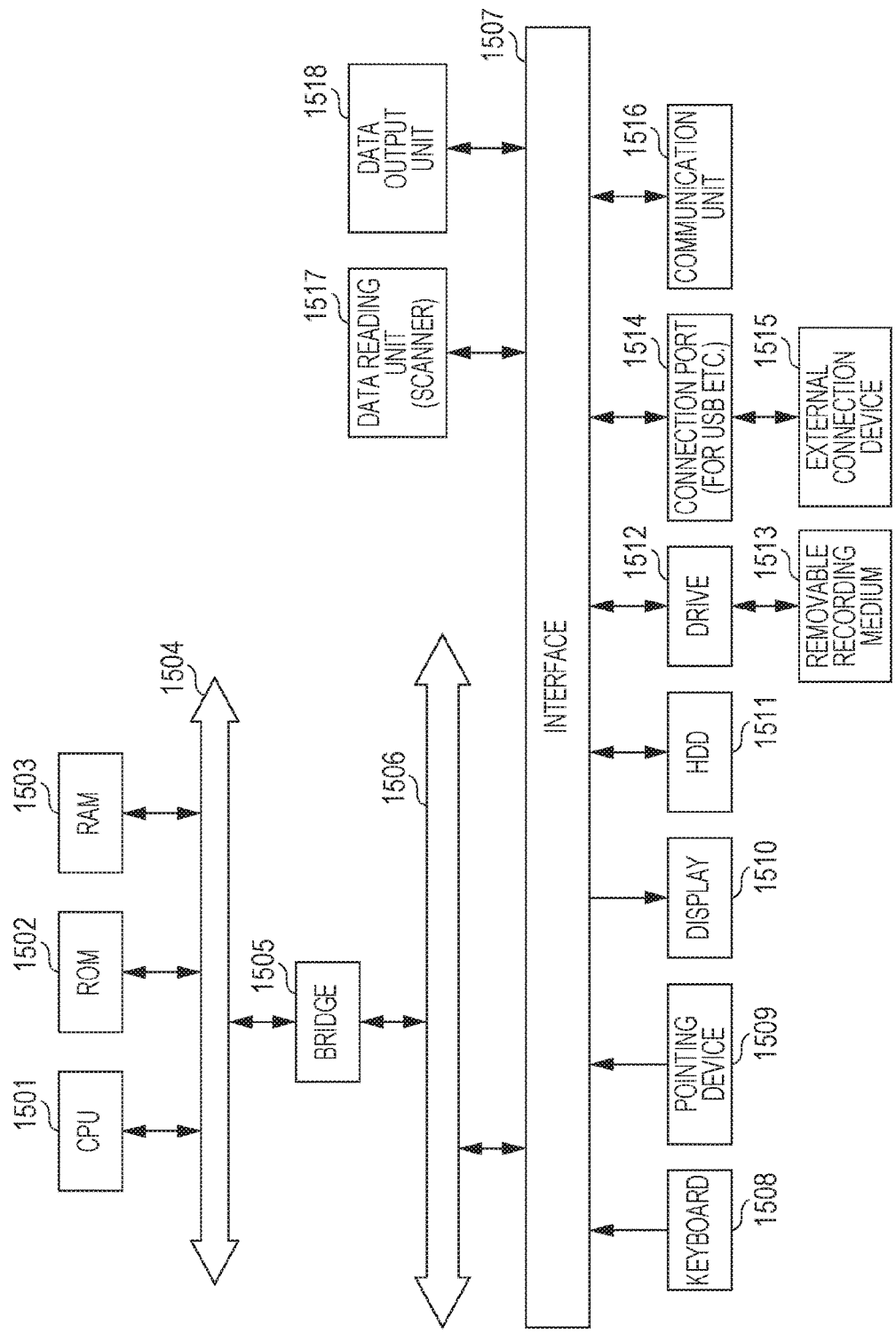

INFORMATION PROCESSING DEVICE, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-215481 filed Nov. 2, 2015.

BACKGROUND

Technical Field

The present invention relates to an information processing device, an information processing system, and a non-transitory computer readable medium.

SUMMARY

According to an aspect of the invention, there is provided an information processing device including an email transmission unit, a memory, and a transmission unit. The email transmission unit transmits an email with an attached image. The memory stores a transmission history including an information identifier of information indicating that the email has been transmitted. The transmission unit transmits, to an external device, transmission-check-response information indicating that transmission has occurred if the transmission history includes an information identifier included in transmission-check-request information received from the external device.

BRIEF DESCRIPTION OF THE DRAWINGS

An exemplary embodiment of the present invention will be described in detail based on the following figures, wherein:

FIG. 11 illustrates an exemplary data structure of sent-email-history information;

FIG. 12 illustrates an exemplary data structure of an email-sending-device table;

FIG. 13 illustrates an exemplary data structure of a rejected-email-address table;

FIG. 14 illustrates an exemplary data structure of an authorized-user table; and FIG. 15 is a block diagram illustrating an exemplary hardware configuration of a computer realizing the exemplary embodiment.

DETAILED DESCRIPTION

An exemplary embodiment to implement the present invention is now described below with reference to the drawings.

Figure 1:
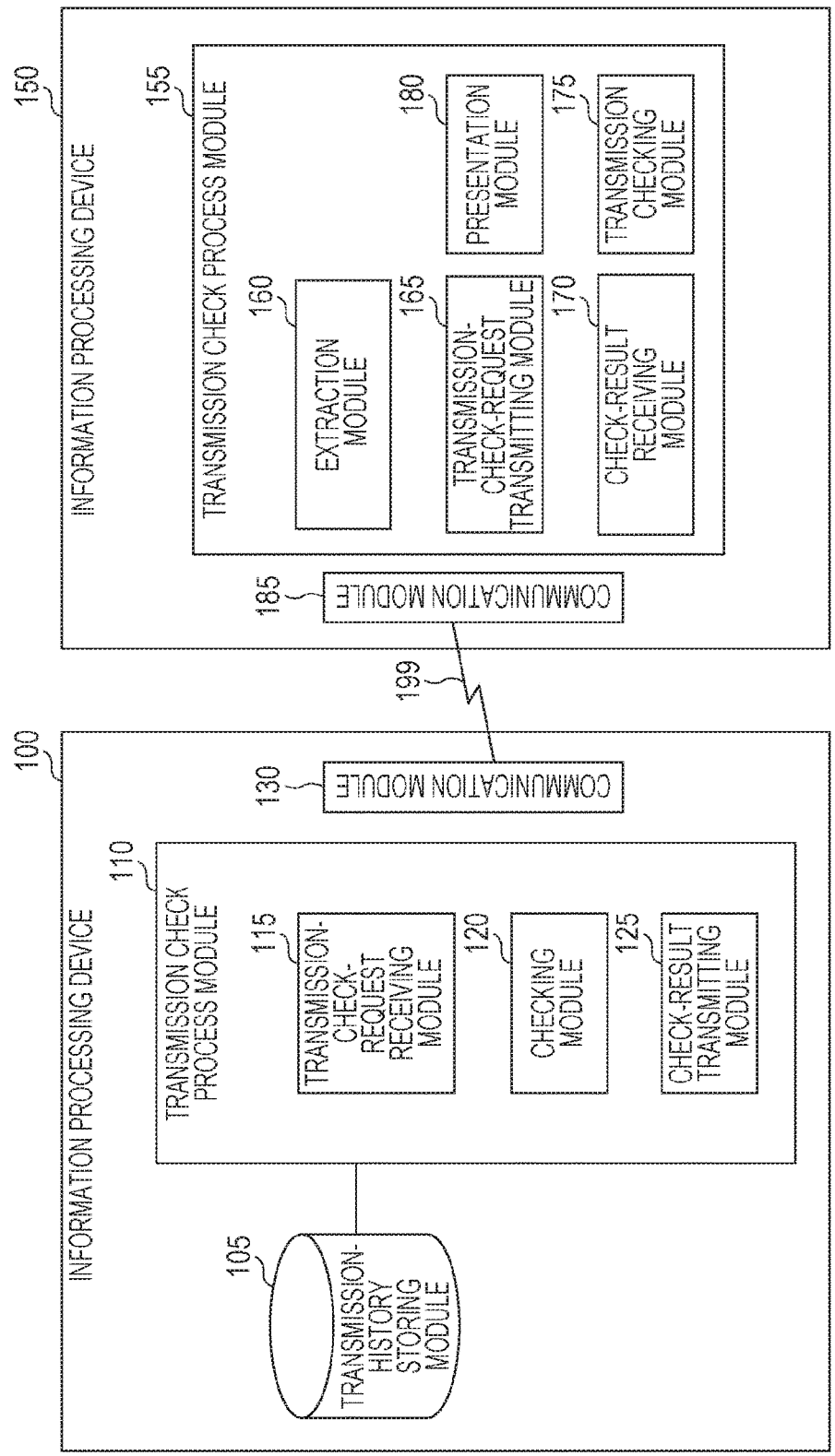
FIG. 1 is a conceptual diagram illustrating an exemplary module configuration according to the exemplary embodiment.

FIG. 1 is a conceptual diagram illustrating an exemplary module configuration according to the exemplary embodiment.

Note that the term "module" generally means a logically separable component of software (computer program), hardware, or the like. Accordingly, a module in the exemplary embodiment refers to not only a module in a computer program but also a module in a hardware configuration. Therefore, the exemplary embodiment will also illustrate a computer program for realizing the function of such a module (a program for causing a computer to execute each step, a program for causing a computer to function as each unit, or a program for causing a computer to realize each function), a system therefor, and a method therefor. For the convenience of description, "store Y", "cause X to store Y", or a similar expression will be used. In an exemplary embodiment illustrating a computer program, such an expression means to cause a memory device (X) to store Y or to perform control in such a manner as to cause a memory device (X) to store Y. Modules and functions may correspond to each other in a one-to-one relationship. Alternatively, in implementation, a single program may realize a single module or plural modules. Conversely, plural programs may realize a single module. Plural modules may be executed by a single computer, or a single module may be executed by plural computers in a distributed or parallel environment. In addition, a single module may include another module. The term "connect" is herein used to describe a physical connection or a logical connection (e.g., data transfer, instruction transmission, or data cross-reference). The term "predetermined" means a state where something is determined prior to a target process and includes the meaning of not only being determined before the start of a process according to the exemplary embodiment but also being determined before the target process even after the start of a process according to the exemplary embodiment, in accordance with the current or previous status. If there are plural "predetermined values", these values may be mutually different values, or two or more values may be the same (it is needless to say that all the values may be the same). In addition, an expression such as "if A, B" is used to indicate that whether or not A is determined, and if it is determined that A, then B. However, this does not apply to the case where the determination as to whether or not A is unnecessary.

Furthermore, a system or a device may be configured by connecting plural computers, hardware components, devices, and the like to one another by using a communication unit, such as a network (including one-to-one-correspondence communication connection), or may be configured by a single computer, hardware component, device, and the like. Note that the terms "system" and "device" are used as synonyms. It may be needless to say that the term "system" does not mean a social mechanism (social system), which is settled by humans.

Furthermore, in the case where plural processes are performed by the respective modules or within a module, target information is read from a memory device in each process, and after the process has been performed, the process result is written into the memory device. Accordingly, description of the reading of information from the memory device before a process and the writing of information into the memory device after the process will be omitted in some cases. Note that examples of the memory device herein may include a hard disk, a random access memory (RAM), an external memory medium, a memory device connected via a communication line, and a register in a central processing unit (CPU).

An information processing system according to the exemplary embodiment sends a notification of information and includes an information processing device 100 and an information processing device 150 as illustrated in the example in FIG. 1. The information processing device 100 stores a transmission history and responds to transmission-check-request information received from the information processing device 150. The information processing device 150 transmits the transmission-check-request information to the information processing device 100 that is supposed to have transmitted the information that the information processing device 150 has received. Note that the expression "send a notification from A (e.g., the information processing device 100) to B (e.g., the information processing device 150)" means transmitting information from A to B. Specifically, examples of the notification include notifications on emails, messages (including messages in short message services (SMSs)), chats, and social networking services (SNSs). Emails will be mainly given as an example below. Examples of the information to be transmitted include text, image, sound, and a combination thereof. In addition, information (e.g., a file) may be attached to the notification.

The information processing device 100 includes a transmission-history storing module 105, a transmission check process module 110, and a communication module 130. The information processing device 100 sends a notification (transmits information) to the information processing device 150.

The communication module 130 is connected to a communication module 185 of the information processing device 150 via a communication line 199. The communication module 130 performs communication with the information processing device 150 under the control of the transmission check process module 110.

The transmission-history storing module 105 is connected to the transmission check process module 110. The transmission-history storing module 105 stores a transmission history including an information identifier of the information transmitted from the information processing device 100. Note that the term "information identifier" means information for uniquely identifying, in the information processing device 100 and the information processing device 150, the information transmitted from the information processing device 100. Examples of the information identifier include a serial number indicating a transmission order (e.g., information in an email ID field 1105 in sent-email-history information 1100 in a later-described example illustrated in FIG. 11) or a value obtained by applying a hash function to the transmitted information. Alternatively, the information identifier may be attached information or a value obtained by applying a hash function to the attached information. For example, the attached information may be an image read by the information processing device 100 or an image in a predetermined area of the image.

The transmission check process module 110 includes a transmission-check-request receiving module 115, a checking module 120, and a check-result transmitting module 125 and is connected to the transmission-history storing module 105. The transmission check process module 110 determines, in response to the transmission-check-request information from the information processing device 150, whether or not information of interest has been transmitted from the information processing device 100 and transmits the determination result as a reply to the information processing device 150.

The transmission-check-request receiving module 115 receives the transmission-check-request information from the information processing device 100 through the communication module 130. The transmission-check-request information includes an information identifier.

When the transmission-check-request receiving module 115 receives the transmission-check-request information, the checking module 120 determines whether or not the transmission history stored in the transmission-history storing module 105 includes the information identifier included in the transmission-check-request information. If the transmission history includes the information identifier, the checking module 120 produces a determination result that the transmission has occurred; if not, the checking module 120 produces a determination result that the transmission has not occurred. Note that the expression "transmission has occurred" means that a notification for which the information processing device 150 requests a transmission check and which is indicated by an information identifier has been sent from the information processing device 100 to the information processing device 150. The expression "transmission has not occurred" means that a notification for which the information processing device 150 requests a transmission check and which is indicated by an information identifier has not been sent from the information processing device 100 to the information processing device 150. Therefore, the case where the transmission has occurred corresponds to a normal state, and the case where the transmission has not occurred corresponds to an abnormal state.

The check-result transmitting module 125 transmits a process result produced by the checking module 120 to the information processing device 150 through the communication module 130. That is, if the transmission history stored in the transmission-history storing module 105 includes the information identifier included in the transmission-check-request information received from the information processing device 150, the check-result transmitting module 125 transmits, to the information processing device 150, transmission-check-response information indicating that transmission has occurred. If the transmission history stored in the transmission-history storing module 105 does not include the information identifier included in the transmission-check-request information received from the information processing device 150, the check-result transmitting module 125 transmits, to the information processing device 150, transmission-check-response information indicating that transmission has not occurred.

The information processing device 150 includes a transmission check process module 155 and the communication module 185. The information processing device 150 receives a notification (receives information) from the information processing device 100. However, this notification may possibly be a spoofing notification. That is, the spoofing notification pretends that the information processing device 100 has sent the notification to the information processing device 150 although the information processing device 100 has not actually sent the notification to the information processing device 150.

The communication module 185 is connected to the communication module 130 of the information processing device 100 via the communication line 199. The communication module 185 performs communication with the information processing device 100 under the control of the transmission check process module 155.

The transmission check process module 155 includes an extraction module 160, a transmission-check-request transmitting module 165, a check-result receiving module 170, a transmission checking module 175, and a presentation module 180. The transmission check process module 155 transmits the transmission-check-request information to the information processing device 100 and, in accordance with a response to the transmission check request (check result), controls presentation by the presentation module 180.

The extraction module 160 extracts the information identifier and a transmitter identifier from the information received by the information processing device 150. The information processing device 150 receives a notification from the information processing device 100 or a notification that pretends to have been sent from the information processing device 100. The extraction module 160 extracts the information identifier and the transmitter identifier that are included in the notification. The information identifier is as described above. The transmitter identifier is information for uniquely identifying, in the information processing device 100 and the information processing device 150, the sending device that has sent the notification. Note that the transmitter identifier in the exemplary embodiment is an identifier that indicates the information processing device 100, such as an internet protocol (IP) address or an email address that indicates the sender. The information identifier and the transmitter identifier may be extracted from the header of an email received by the information processing device 150.

The transmission-check-request transmitting module 165 transmits the transmission-check-request information including the information identifier extracted by the extraction module 160 to the information processing device 100, which is the sending device indicated by the transmitter identifier extracted by the extraction module 160, through the communication module 185.

The check-result receiving module 170 receives transmission-check-response information from the information processing device 100 through the communication module 185 as a reply to the transmission check request transmitted from the transmission-check-request transmitting module 165 to the information processing device 100.

The transmission checking module 175 controls the presentation by the presentation module 180 in accordance with, for example, the transmission-check-response information received by the check-result receiving module 170. That is, if transmission-check-response information indicating that transmission has not occurred is received from the information processing device 100 or if transmission-check-response information indicating that transmission has occurred is not received from the information processing device 100 within a predetermined period, the transmission checking module 175 causes the presentation module 180 to present a warning. If transmission-check-response information indicating that transmission has occurred is received from the information processing device 100, the transmission checking module 175 performs a process for receiving a target notification (e.g., a common process for receiving an email).

The presentation module 180 presents a warning or the like under the control of the transmission checking module 175. The warning may be presented by, for example, displaying the warning on a display device such as a display included in the information processing device 150, printing the warning by using a printing device such as a printer, outputting a sound by using a sound output device such as a speaker, using vibration caused by a vibration device, and the like, and a combination thereof.

Figure 2:
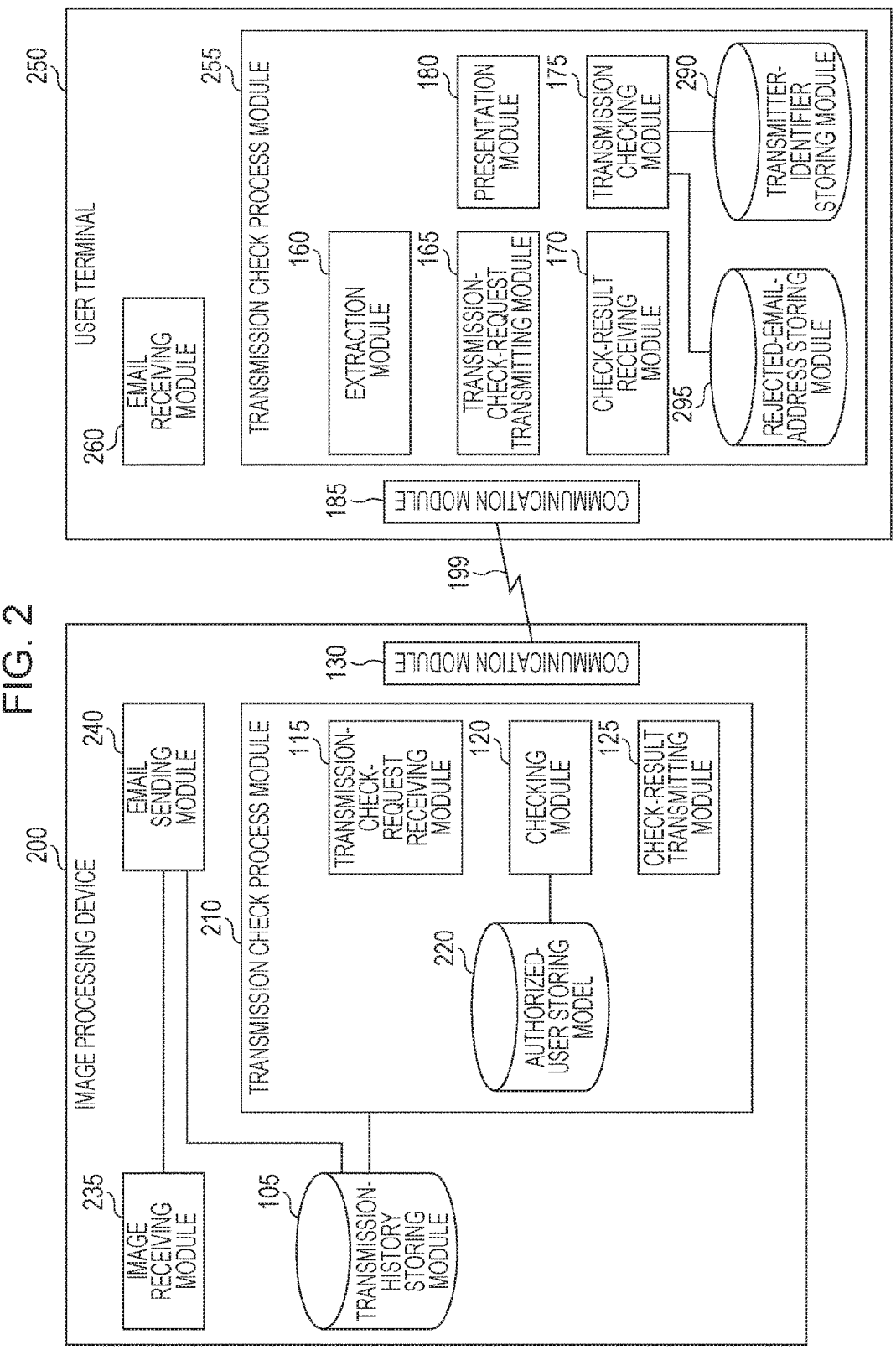
FIG. 2 illustrates a module configuration in the case of using an image processing device as an information processing device according to the exemplary embodiment.

FIG. 2 illustrates a module configuration in the case of using an image processing device as an information processing device according to the exemplary embodiment. Specifically, an image processing device 200 and a user terminal 250 are respectively used as the information processing device 100 and the information processing device 150 illustrated in the example in FIG. 1 and perform a more detailed process. Note that the same kinds of parts as those in the exemplary embodiment illustrated with reference to the example in FIG. 1 are denoted by the same reference numerals, and repeated description thereof is omitted.

The image processing device 200 is any of a copying machine, a facsimile, a scanner, a printer, a multifunction peripheral (an image processing device having any two or more of a scanner function, a printer function, a copying machine function, a facsimile function, and the like). In particular, the image processing device 200 may have a scanner function. The following example describes a multifunction peripheral mainly having a scanner function.

For example, the image processing device 200 transmits an image read by using a scanner function to the user terminal 250 by email. In order to determine whether or not the received email is a spoofing email, the user terminal 250 transmits transmission-check-request information to the image processing device 200 that is supposed to have sent the email. The image processing device 200 performs a process (a process for determining whether or not an email corresponding to an information identifier has been sent) in accordance with the transmission-check-request information and transmits the process result to the user terminal 250 as a reply. The user terminal 250 performs a process in accordance with the process result.

The image processing device 200 includes the transmission-history storing module 105, a transmission check process module 210, an image receiving module 235, an email sending module 240, and the communication module 130.

The image receiving module 235 is connected to the email sending module 240. The image receiving module 235 receives an image. For example, the image receiving module 235 may read an image by using a scanner function, may receive an image from an external device through a communication line by using a facsimile function, and may read an image stored in a memory device (e.g., a memory device incorporated in the image processing device 200 or a memory device connected via a network) such as a hard disk. The image may be a binary image or a multi-value image (e.g., a color image). The image receiving module 235 may receive a single image or plural images. The image may contain a document for business, a brochure for advertisement, or the like.

The email sending module 240 is connected to the transmission-history storing module 105 and the image receiving module 235. The email sending module 240 sends, to the user terminal 250 through the communication module 130, an email to which an image received by the image receiving module 235 is attached. For example, an email with an attached image may be sent to the user terminal 250 in accordance with an email sending operation performed by an operator. Note that instead of sending an email with an attached image, a message reporting an error that has occurred in the image processing device 200 may be sent without attaching an image.

In order to send an email, the email sending module 240 writes an "information identifier of transmitted information" in the email in advance. The writing area may be the body or the property (attribute) area of the email. The email sending module 240 then causes the transmission-history storing module 105 to store the email sending history.

The transmission-history storing module 105 is connected to the transmission check process module 210 and the email sending module 240. The transmission-history storing module 105 stores a history of an email sending process performed by the email sending module 240. For example, the transmission-history storing module 105 stores sent-email-history information 1100. FIG. 11 illustrates an exemplary data structure of the sent-email-history information 1100. The sent-email-history information 1100 includes an email ID field 1105, a sending date and time field 1110, a sender field 1115, an email address field 1120, a number-of-attached-files field 1125, an attached file ID field 1130, an attached file name field 1135, an attached file type field 1140, an attached file creation date and time field 1145, an attached file scanning date and time field 1150, an attached file capacity field 1155, and a scan instructor field 1160.

In the exemplary embodiment, the email ID field 1105 stores information (email identification (ID)) for uniquely identifying an email. The sending date and time field 1110 stores the date and time at which the email was sent (year, month, day, hour, minute, second, a unit smaller than second, or a combination thereof). The sender field 1115 stores the sender of the email. The email address field 1120 stores the address of the email. The number-of-attached-files field 1125 stores the number of files attached to the email. In the exemplary embodiment, the attached file ID field 1130 stores information (attached file ID) for uniquely identifying an attached file. The attached file name field 1135 stores the name of the attached file. Alternatively, the attached file name field 1135 may store the attached file itself. The attached file type field 1140 stores the type of the attached file. For example, the type of the attached file may be an extension. Specifically, the extension may be jpeg, png, bmp, or the like indicating an image file, pdf indicating an application file, or the like. The attached file creation date and time field 1145 stores the date and time at which the attached file was created. The attached file scanning date and time field 1150 stores the date and time at which the attached file was scanned. The attached file capacity field 1155 stores the capacity of the attached file. The scan instructor field 1160 stores the instructor who gave an instruction for scanning (or the sender of the email).

Note that the term "information identifier of transmitted information" may be, for example, information included in the email ID field 1105 or the attached file ID field 1130. Alternatively, the information identifier of transmitted information may be a value obtained by applying a hash function to any of the body of the email, the attribute of the email, and a combination of the body and the attribute. Further alternatively, the information identifier of transmitted information may be an attached image itself or a value obtained by applying a hash function to the attached image. The target of the application may be a partial area in a predetermined area (e.g., an upper left area specified by coordinates, width, and height) of the image. By using, as the information identifier of transmitted information, an image read by using the scanner function of the image receiving module 235, it becomes more difficult to forge information indicative of an email transmitted from the image processing device 200 than in the case of using a simple character string.

The transmission check process module 210 includes the transmission-check-request receiving module 115, the checking module 120, the check-result transmitting module 125, and an authorized-user storing module 220 and is connected to the transmission-history storing module 105. The transmission check process module 210 corresponds to the transmission check process module 110 of the information processing device 100 illustrated in the example in FIG. 1.

The transmission-check-request receiving module 115 notifies a predetermined person of user information (e.g., the email address, user name, or user ID) of a user who has asked for the transmission history. Examples of the term "predetermined person" may include a manager of the image processing device 200. In addition, examples of the notification include notifications on emails, messages, chats, and SNSs.

The checking module 120 is connected to the authorized-user storing module 220. If transmission-check-request information is received from a user who is not authorized to ask about the transmission history, the checking module 120 rejects the transmission check request. Note that the term "reject" means, for example, any one of the following: not performing a process regarding the question about the transmission history, sending a reply indicating that the user is not authorized, and sending, to the above-mentioned predetermined person, a notification of the reception of the transmission-check-request information from the unauthorized user. The process for determining whether or not the user is authorized is performed by determining whether or not the user is included in an authorized user list stored in the authorized-user storing module 220.

The authorized-user storing module 220 is connected to the checking module 120. The authorized-user storing module 220 stores the authorized user list. For example, the authorized-user storing module 220 stores an authorized-user table 1400. FIG. 14 illustrates an exemplary data structure of the authorized-user table 1400. The authorized-user table 1400 includes an authorized ID field 1410, an email address field 1420, and a user name field 1430. In the exemplary embodiment, the authorized ID field 1410 stores information (authorized IDs) for uniquely identifying the authorized users. The email address field 1420 stores email addresses of the authorized users. The user name field 1430 stores user names of the authorized users. Note that the user name field 1430 may store other information (e.g., employee numbers or organization IDs of organizations to which the users belong) as long as the information may be used to identify the person who has made the transmission check request.

The checking module 120 determines whether or not the authorized-user table 1400 includes the email address or user name of the person who has made the transmission check request. If the authorized-user table 1400 includes the email address or user name of the person who has made the transmission check request, the checking module 120 performs a process for checking the transmission history; if not, the checking module 120 performs the above-described rejection process.

If the transmission-check-request information includes the date and time at which a scanned document was created as an attached document, the checking module 120 may determine whether or not the date and time correspond to the date and time written in the attached file creation date and time field 1145 in the sent-email-history information 1100 as a process for checking the transmission history in addition to the above-described process. Alternatively, the checking module 120 may determine whether or not the date and time at which the attached document was created is within a predetermined period after the date and time written in the attached file scanning date and time field 1150. Since the document transmitted from the image processing device 200 is an image read by using a scanner function of the image receiving module 235, if the date and time at which the attached document was created is before the date and time written in the attached file scanning date and time field 1150, transmission-check-response information indicating that transmission has not occurred is transmitted as a reply. If the date and time at which the attached document was created is not within the predetermined period after the date and time written in the attached file scanning date and time field 1150, transmission-check-response information indicating that transmission has not occurred is transmitted as a reply. Note that the term "predetermined period" means a predetermined period (e.g., the maximum, mode, or average of periods that were previously measured) for the image processing device 200 to convert a scanned image to a document to be attached to an email.

The communication module 130 is connected to the communication module 185 of the user terminal 250 via the communication line 199.

The user terminal 250 includes a transmission check process module 255, an email receiving module 260, and the communication module 185.

The email receiving module 260 receives an email transmitted from the image processing device 200 through the communication module 185. The email receiving module 260 then transfers the email to the extraction module 160 without performing a process for opening the email, for example.

The transmission check process module 255 includes the extraction module 160, the transmission-check-request transmitting module 165, the check-result receiving module 170, the transmission checking module 175, the presentation module 180, a transmitter-identifier storing module 290, and a rejected-email-address storing module 295. The transmission check process module 255 corresponds to the transmission check process module 155 of the information processing device 150 illustrated in the example in FIG. 1.

Figure 10:
FIG. 10 illustrates an exemplary data structure of email header information.

The extraction module 160 extracts a transmitter identifier from the email header information. An example of the email header information is email header information 1000. FIG. 10 illustrates an exemplary data structure of the email header information 1000. The email header information 1000 includes a Return-Path field 1005, an X-Original-To field 1010, a Delivered-To field 1015, a Received field 1020, a Message-ID field 1025, a From field 1030, a To field 1035, a Reply-To field 1040, a Subject field 1045, a Date field 1050, a MIME-Version field 1055, a Content-Type field 1060, a Content-Transfer-Encoding field 1065, and an X-Mailer field 1070. The Return-Path field 1005 stores Return-Path. If a sender sends an email to an unavailable or nonexistent email address, an email server that has received the email automatically sends a notification of a failure of sending the email to Return-Path of the sender. The X-Original-To field 1010 stores X-Original-To. X-Original-To is an email address to which a sender has originally sent an email. X-Original-To is added if, for example, an email server that has received an email forwards the email to another email address. The Delivered-To field 1015 stores Delivered-To. Delivered-To is an email address to which an email is forwarded from another email address to which a sender has originally sent the email. Delivered-To is added if, for example, an email server that has received an email forwards the email to another email address. The Received field 1020 stores Received. In Received, the IP address or domain name of an email server through which an email is transferred, the IP address or domain name of a sending device, and the like are recorded. The number of items recorded in Received corresponds to the number of email servers through which an email is transferred. The Message-ID field 1025 stores Message-ID. Message-ID is an email identification number that is added by an email server. The From field 1030 stores From. From is a sender's email address. It is possible to send an email by using another person's email address as the address in From, and thus a spoofing email is sent by using a forged email address. The To field 1035 stores To. To is the email address to which an email is sent. The Reply-To field 1040 stores Reply-To. Reply-To is an email address to which a replay email is sent. The Subject field 1045 stores Subject. Subject is the title (subject) of an email. The Date field 1050 stores Date. Date is the date and time at which an email is received. The MIME-Version field 1055 stores MIME-Version. MIME-Version is the MIME version of an email. The Content-Type field 1060 stores Content-Type. Content-Type is a file format, such as text or HTML. The Content-Transfer-Encoding field 1065 stores Content-Transfer-Encoding. Content-Transfer-Encoding is the encoding scheme of an email. The X-Mailer field 1070 stores X-Mailer. X-Mailer is the name of an email software (mailer) used by a sender.

The extraction module 160 extracts the transmitter identifier from the From field 1030 or the Received field 1020 of the email header information 1000. Alternatively, the extraction module 160 may extract the transmitter identifier from the Reply-To field 1040.

If the information received by the email receiving module 260 does not include a specific description, the transmission-check-request transmitting module 165 does not perform a process for transmitting transmission-check-request information. For example, it is determined whether or not the title written in the Subject field 1045 in the email header information 1000 includes a predetermined character string (e.g., "Scan Data from XXX"). If the predetermined character string is included, a process for transmitting transmission-check-request information is performed; if not, a process for transmitting transmission-check-request information is not performed.

The transmitter-identifier storing module 290 is connected to the transmission checking module 175. The transmitter-identifier storing module 290 stores a transmitter-identifier table, such as an email-sending-device table 1200. FIG. 12 illustrates an exemplary data structure of the email-sending-device table 1200. The email-sending-device table 1200 includes a device ID field 1210, an email address field 1220, and an IP address field 1230. In the exemplary embodiment, the device ID field 1210 stores information (device ID) for uniquely identifying the image processing device 200, which sends an email. The email address field 1220 stores the email address from which the email has been sent from the above device. The IP address field 1230 stores the IP address of the above device.

The transmission checking module 175 is connected to the transmitter-identifier storing module 290 and the rejected-email-address storing module 295. If the emailsending-device table 1200 stored in the rejected-email-address storing module 295 does not include the transmitter identifier, the transmission checking module 175 causes the presentation module 180 to present a warning. The email-sending-device table 1200 is what is called a whitelist, and accordingly, an email from a device that is not included in the email-sending-device table 1200 is a target for which a warning is to be presented.

If transmission-check-response information indicating that transmission has not occurred is received or if transmission-check-response information indicating that transmission has occurred is not received within a predetermined period, the transmission checking module 175 performs any one or more of the following processes: adding the email address of the sender of the information received by the email receiving module 260 to a rejection list in the rejected-email-address storing module 295, notifying a predetermined manager, running a virus scanner on the information received by the email receiving module 260, and deleting the information received by the email receiving module 260. Note that the virus scanner may also be run on an attached file.

The rejected-email-address storing module 295 is connected to the transmission checking module 175. The rejected-email-address storing module 295 stores, for example, a list of email addresses from which emails are to be rejected and are not to be received, such as a rejected-email-address table 1300. FIG. 13 illustrates an exemplary data structure of the rejected-email-address table 1300. The rejected-email-address table 1300 includes a rejected ID field 1310, an email address field 1320, an IP address field 1330, and a registration date and time field 1340. In the exemplary embodiment, the rejected ID field 1310 stores rejected IDs for uniquely identifying emails that are to be rejected. The email address field 1320 stores email addresses of senders from which emails are to be rejected. The IP address field 1330 stores IP addresses of sending devices from which emails are to be rejected. The registration date and time field 1340 stores the date and time at which the information was registered in the email address field 1320 and the IP address field 1330.

The transmission checking module 175 registers email addresses of senders from which emails are to be rejected and are not to be received in the email address field 1320 or the IP address field 1330 in the rejected-email-address table 1300. The rejected-email-address table 1300 is what is called a blacklist, and the transmission checking module 175 generates a blacklist. The transmission checking module 175 rejects emails sent from the email addresses of senders included in the rejected-email-address table 1300.

The communication module 185 is connected to the communication module 130 of the image processing device 200 via the communication line 199.

Figure 3:
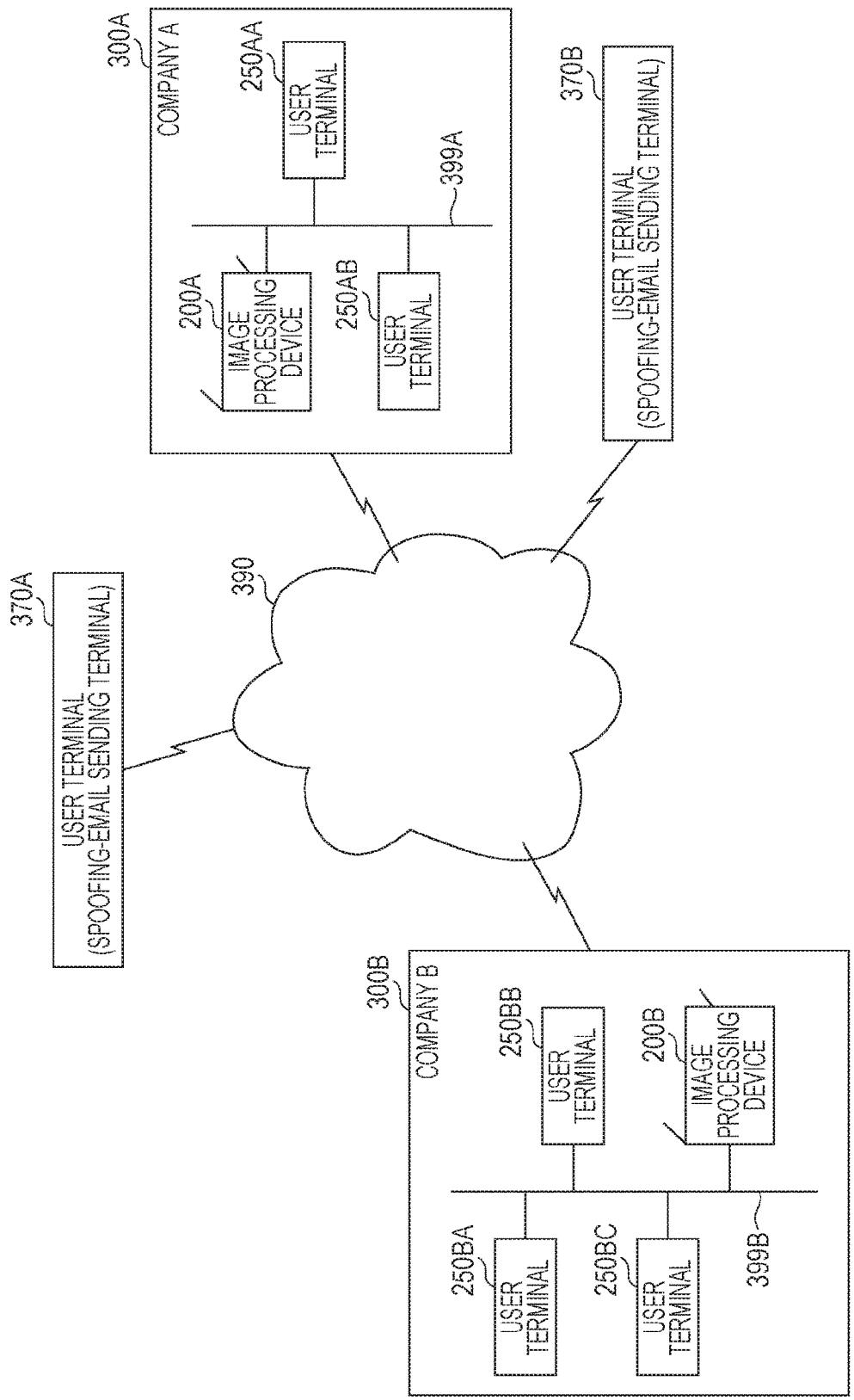
FIG. 3 illustrates an exemplary system configuration in the case of using information processing devices according to the exemplary embodiment.

FIG. 3 illustrates an exemplary system configuration in the case of using the information processing devices according to the exemplary embodiment.

An image processing device 200A, a user terminal 250AA, and a user terminal 250AB are installed in a company A 300A. The image processing device 200A, the user terminal 250AA, and the user terminal 250AB are connected to each other via a communication line 399A.

An image processing device 200B, a user terminal 250BA, a user terminal 250BB, and a user terminal 250BC are installed in a company B 300B. The image processing device 200B, the user terminal 250BA, the user terminal 250BB, and the user terminal 250BC are connected to each other via a communication line 399B.

The devices in the company A 300A, the devices in the company B 300B, a user terminal (spoofing-email sending terminal) 370A, and a user terminal (spoofing-email sending terminal) 370B are connected to each other via a communication line 390. The communication lines 399A and 399B and the communication line 390 may be a wireless line, a wired line, or a combination thereof, such as an Internet line as a telecommunication infrastructure or an intranet line. Email servers are connected to the communication line 399A, the communication line 399B, or the communication line 390.

In such a case, a scanned email (an email from the image processing device 200A, an email from the image processing device 200B, or a spoofing email) is sent and transferred through any one of the following three routes, for example. Details will be given with reference to the example in FIG. 4.

Route 1 is taken in the case where an email is sent from the image processing device 200A to the user terminal 250AA and corresponds to what is called normal email sending. That is, in this case, transmission-check-response information indicating that transmission has occurred is transmitted to the information processing device 100.

Route 2 is taken in the case where an email is sent from the image processing device 200B to the user terminal 250AA and corresponds to what is called normal email sending. That is, in this case, transmission-check-response information indicating that transmission has occurred is transmitted to the information processing device 100.

Route 3 is taken in the case where a spoofing email is sent from the user terminal (spoofing-email sending terminal) 370A pretending to be the image processing device 200A or the image processing device 200B to the user terminal 250AA.

Figure 4:
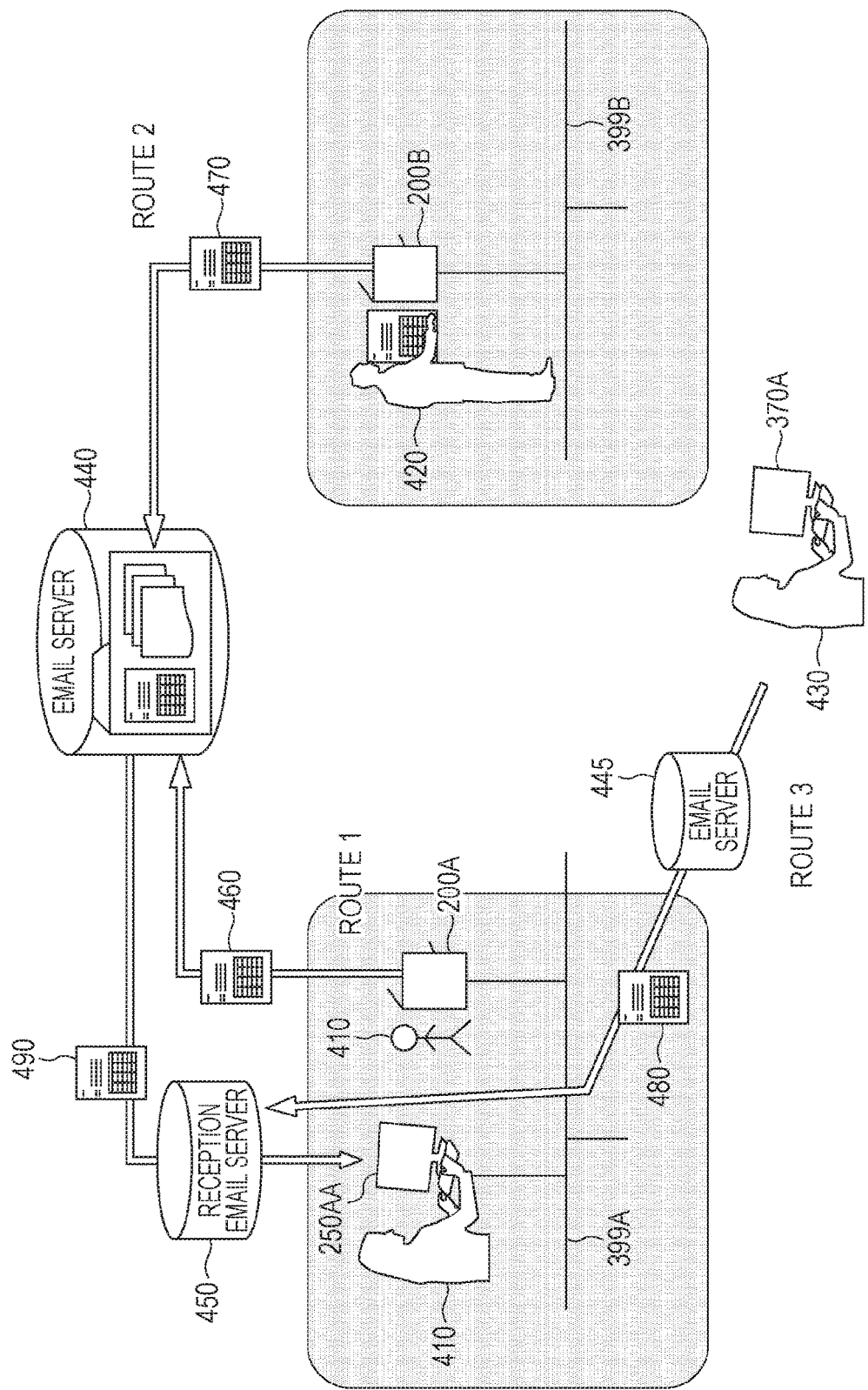
FIG. 4 illustrates an overall email process.

FIG. 4 illustrates an overall email process.

In Route 1, in accordance with an operation by an authorized user 410, an image read by the image processing device 200A is stored in an email server 440 as a scanned image email 460 and is transferred from the email server 440 to a reception email server 450 as an email 490. Then, in accordance with an operation by the authorized user 410, email software in the user terminal 250AA extracts, from the reception email server 450, the email addressed to the authorized user 410. That is, in this case, the authorized user 410 receives, as an email, the image that has been scanned by the authorized user 410. It is needless to say that the person who sends an email by using the image processing device 200A and the person who receives the email may be different persons.

In Route 2, in accordance with an operation by an authorized user 420, an image read by the image processing device 200B is stored in the email server 440 as a scanned image email 470 and is transferred from the email server 440 to the reception email server 450 as an email 490. Then, in accordance with an operation by the authorized user 410, email software in the user terminal 250AA extracts, from the reception email server 450, an email addressed to the authorized user 410.

In Route 3, in accordance with an operation by an unauthorized user 430 (or by using an automatic sending function), the user terminal (spoofing-email sending terminal) 370A sends a spoofing email 480 addressed to the authorized user 410, and the spoofing email 480 is transferred through an email server 445 and stored in the reception email server 450. Then, in accordance with an operation by the authorized user 410, email software in the user terminal 250AA extracts, from the reception email server 450, an email addressed to the authorized user 410.

A spoofing email has the following characteristics, for example.

1. The email address of the sender of the spoofing email has the same domain name as the email address of an authorized user. Specifically, the domain name following "@" in an email address is the same as the domain name of the email address of the authorized user 410 or the authorized user 420.
2. The subject of the spoofing email is the same as or similar to that written in a template for an email sent from the image processing device 200A or the image processing device 200B.
3. An attached file (the spoofing email 480 in this example) includes a virus.

Figure 5:
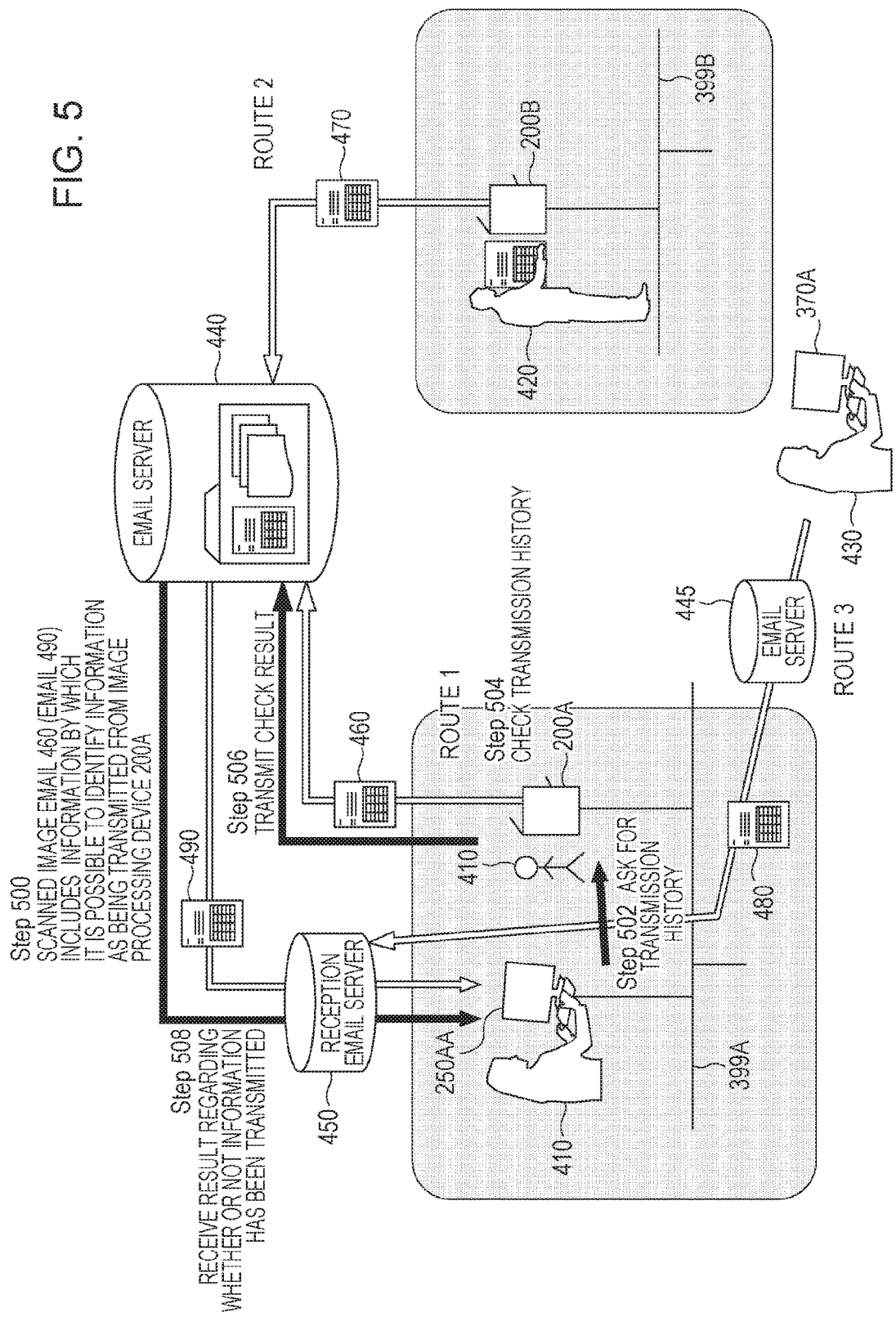
FIG. 5 illustrates an exemplary process according to the exemplary embodiment.

FIG. 5 illustrates an exemplary process according to the exemplary embodiment.

In Step 500, the scanned image email 460 is sent from the image processing device 200A to the authorized user 410 (the user terminal 250AA). Note that the scanned image email 460 (the email 490) includes the information (information identifier) by which it is possible to identify the information as being transmitted from the image processing device 200A.

In Step 502, the user terminal 250AA asks for the transmission history (transmits transmission-check-request information) to the image processing device 200A.

In Step 504, the image processing device 200A checks the transmission history.

In Step 506, the image processing device 200A transmits the check result to the authorized user 410 (the user terminal 250AA).

In Step 508, the user terminal 250AA receives the result regarding whether or not a target transmission history exists from the image processing device 200A. In the case of the above-described Route 1, the result indicates that transmission has occurred (the target transmission history exists), and in the case of the above-described Route 3, the result indicates that transmission has not occurred (the target transmission history does not exist). In the case of the above-described Route 2, the user terminal 250AA asks the image processing device 200B for the transmission history.

Figure 6:
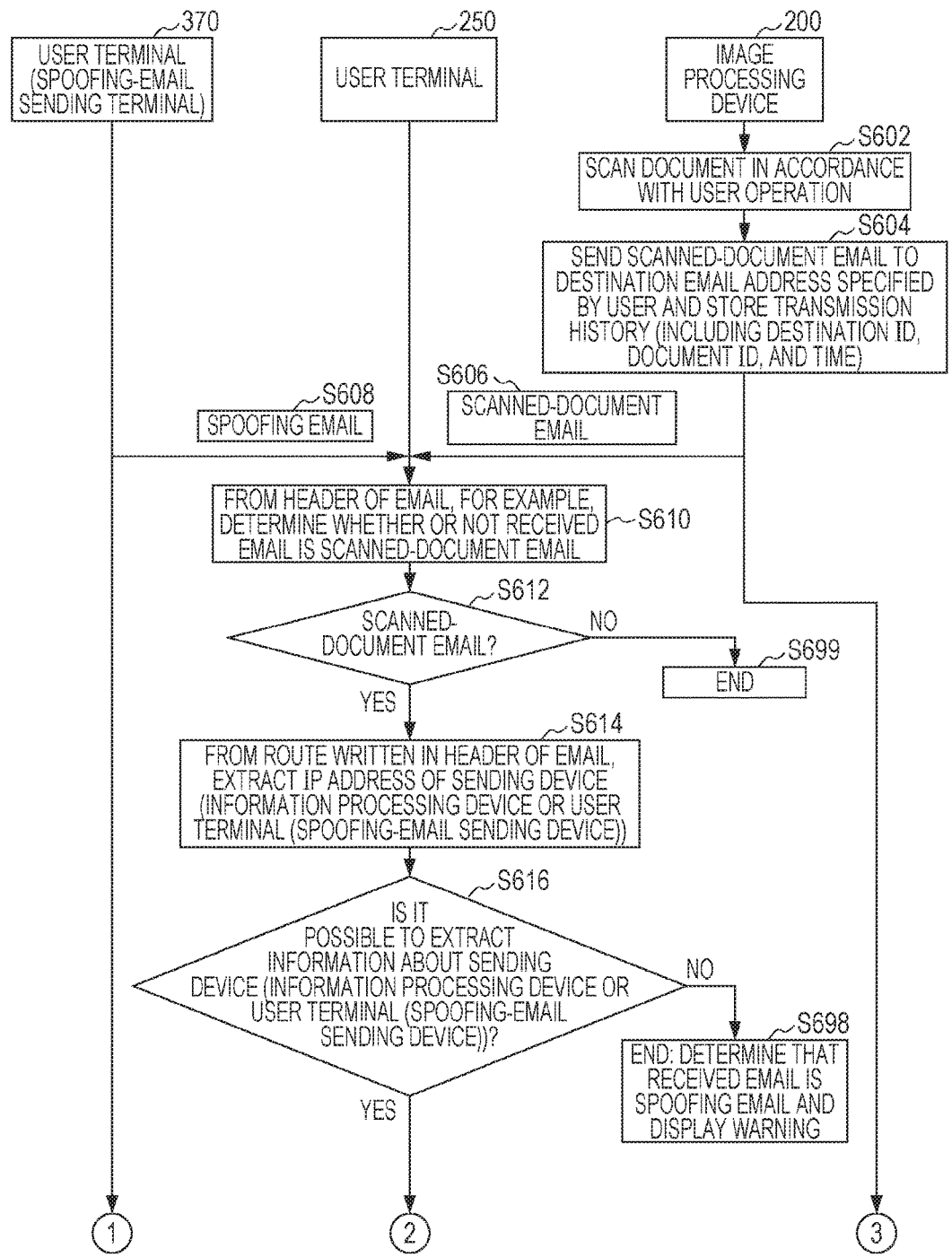
FIG. 6 is a flowchart illustrating an exemplary process according to the exemplary embodiment.
Figure 7:
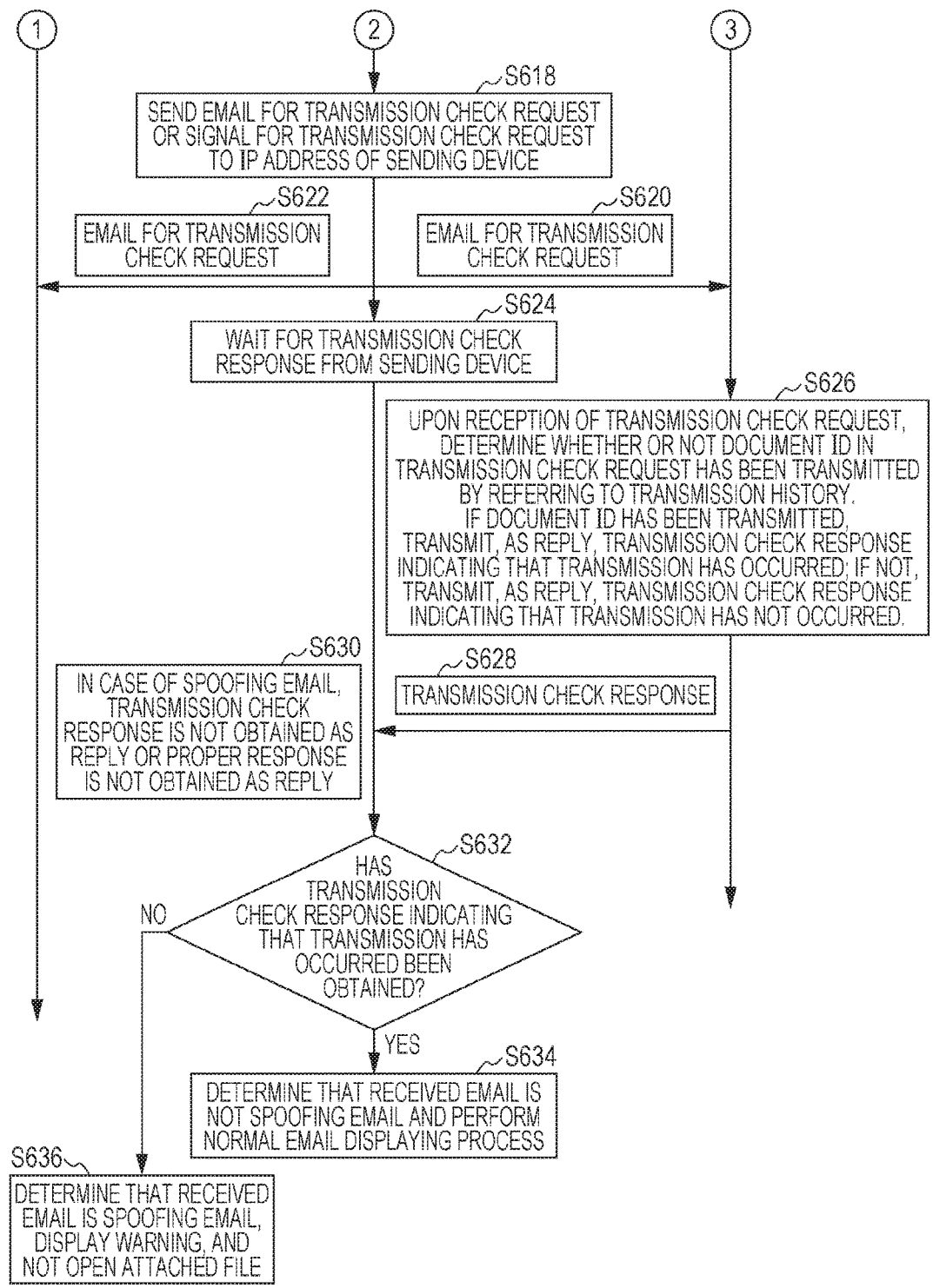
FIG. 7 is the flowchart illustrating the exemplary process according to the exemplary embodiment.

FIGS. 6 and 7 illustrate a flowchart of an exemplary process according to the exemplary embodiment. Note that the process performed by the image processing device 200 and the user terminal 250 corresponds to the above-described process in Route 1 or Route 2, and the process performed by a user terminal (spoofing-email sending terminal) 370 and the user terminal 250 corresponds to the above-described process in Route 3. The process performed by the user terminal 250 is automatically performed before email software in the user terminal 250 opens a received email in accordance with a user operation.

In step S602, the image processing device 200 scans a document in accordance with a user operation.

In step S604, the image processing device 200 sends a scanned-document email to a destination email address specified by the user. The transmission history (including the destination ID, document ID, and time) is stored.

In step S606, the image processing device 200 sends the scanned-document email to the user terminal 250.

In step S608, the user terminal (spoofing-email sending terminal) 370 sends a spoofing email to the user terminal 250.

In step S610, from the header of an email or the like, the user terminal 250 determines whether or not the received email is the scanned-document email.

In step S612, the user terminal 250 determines whether or not the received email is the scanned-document email. If the received email is the scanned-document email, the process proceeds to step S614; if not, the process ends (step S699).

In step S614, from the route written in the header of the email, the user terminal 250 extracts the IP address of the sending device (the image processing device 200 or the user terminal (spoofing-email sending terminal) 370).

In step S616, the user terminal 250 determines whether or not it is possible to extract information about the sending device (the image processing device 200 or the user terminal (spoofing-email sending terminal) 370). If it is possible to extract the information, the process proceeds to step S618; if not, the process ends (the received email is determined to be a spoofing email and a warning is displayed (step S698)).

In the description in a template of an email sent from the image processing device 200, for example, the name of the sending device, the location of the sending device, and the like are described following character strings "Device Name:", "Device Location:", and the like. It is sufficient to determine whether or not it is possible to extract such information.

In step S618, the user terminal 250 sends an email for a transmission check request or transmits a signal for a transmission check request to the IP address of the sending device. The transmission check request includes a document ID.

In step S620, the user terminal 250 sends the email for a transmission check request to the image processing device 200.

In step S622, the user terminal 250 sends the email for a transmission check request to the user terminal (spoofing-email sending terminal) 370.

In step S624, the user terminal 250 waits for a transmission check response from the sending device.

Upon reception of a transmission check request, in step S626, the image processing device 200 determines, by referring to the transmission history, whether or not the document ID in the transmission check request has been transmitted. If the document ID has been transmitted, the image processing device 200 transmits as a reply a transmission check response indicating that transmission has occurred; if not, the image processing device 200 transmits as a reply a transmission check response indicating that transmission has not occurred.

In step S628, the image processing device 200 transmits a transmission check response to the user terminal 250.

In the case of a spoofing email, in step S630, a transmission check response is not obtained as a reply or a proper response is not obtained as a reply. The expression "proper response is not obtained" means the case where a transmission check response indicating that transmission has occurred or a transmission check response indicating that transmission has not occurred is not obtained.

In step S632, the user terminal 250 determines whether or not the transmission check response indicating that transmission has occurred has been obtained. If the transmission check response indicating that transmission has occurred is obtained, the process proceeds to step S634; if not, the process proceeds to step S636.

In step S634, the user terminal 250 determines that the received email is not a spoofing email and performs a normal email displaying process.

In step S636, the user terminal 250 determines that the received email is a spoofing email, displays a warning, and does not open an attached file.

Figure 8:
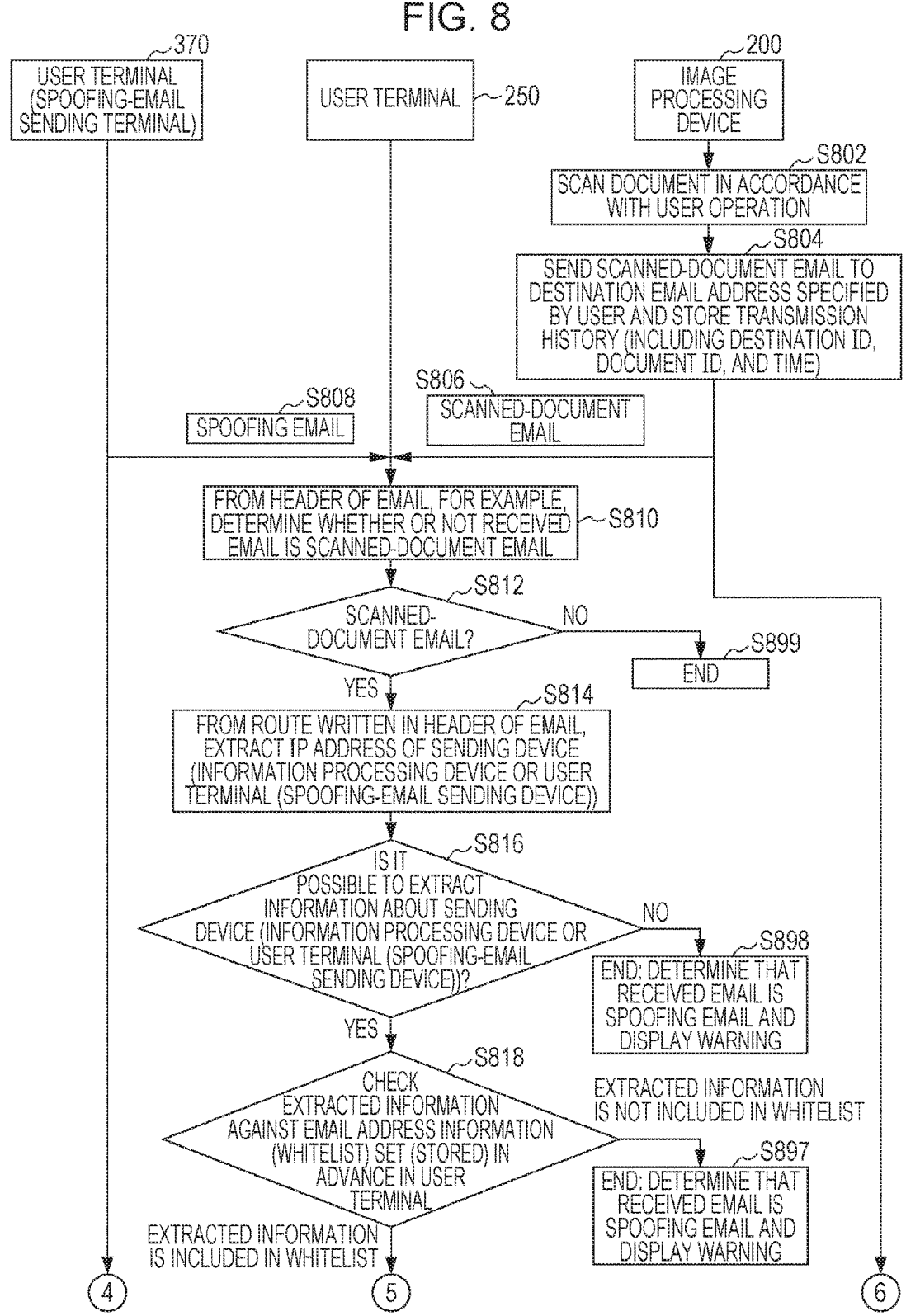
FIG. 8 is a flowchart illustrating an exemplary process according to the exemplary embodiment.
Figure 9:
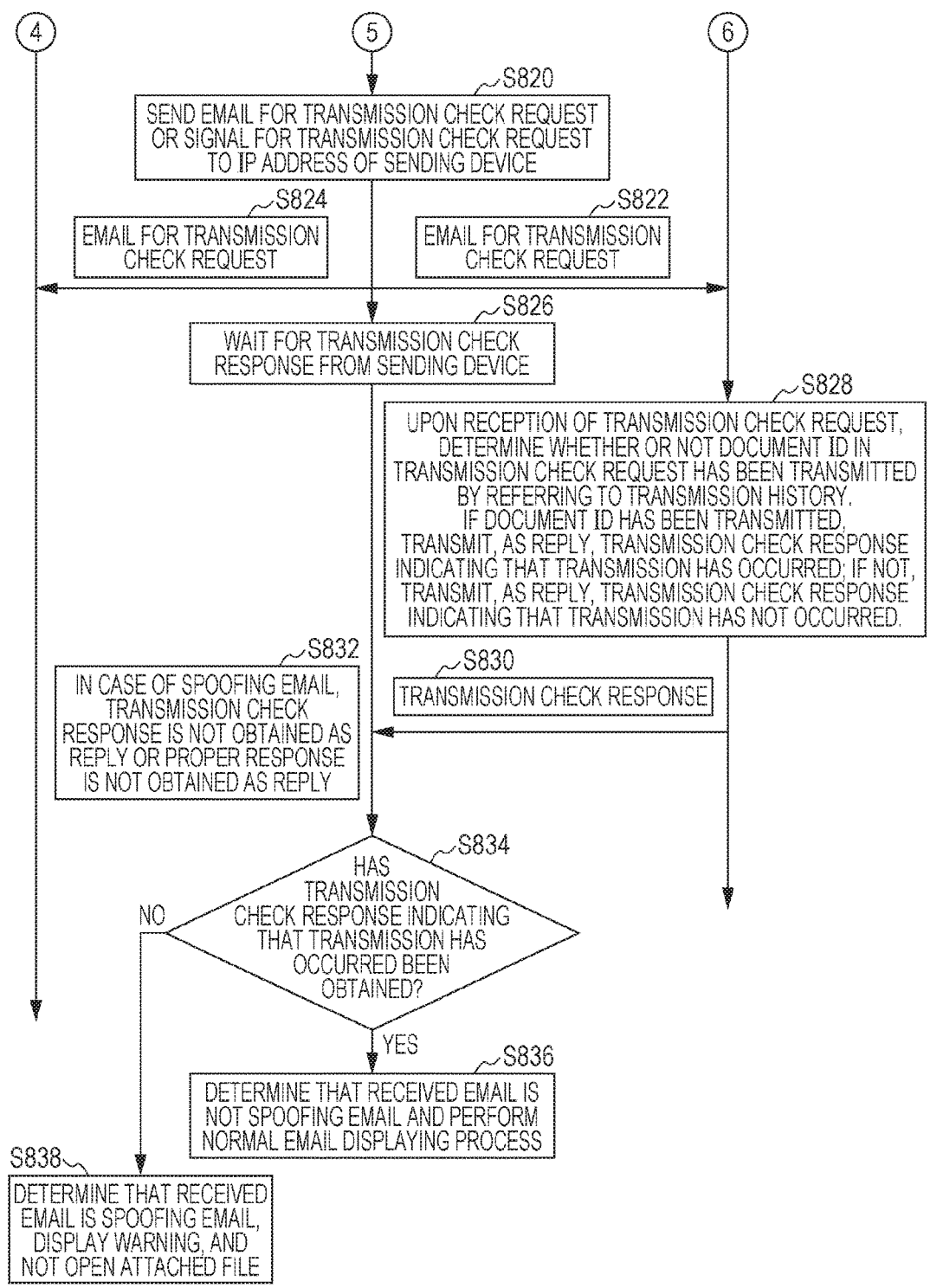
FIG. 9 is the flowchart illustrating the exemplary process according to the exemplary embodiment.

FIGS. 8 and 9 illustrate a flowchart of an exemplary process according to the exemplary embodiment. FIGS. 8 and 9 are obtained by adding steps S818 and S897 to the flowchart illustrated in FIGS. 6 and 7.

In step S802, the image processing device 200 scans a document in accordance with a user operation.

In step S804, the image processing device 200 sends a scanned-document email to a destination email address specified by the user. The transmission history (including the destination ID, document ID, and time) is stored.

In step S806, the image processing device 200 sends the scanned-document email to the user terminal 250.

In step S808, the user terminal (spoofing-email sending terminal) 370 sends a spoofing email to the user terminal 250.

In step S810, from the header of an email or the like, the user terminal 250 determines whether or not the received email is the scanned-document email.

In step S812, the user terminal 250 determines whether or not the received email is the scanned-document email. If the received email is the scanned-document email, the process proceeds to step S814; if not, the process ends (step S899).

In step S814, from the route written in the header of the email, the user terminal 250 extracts the IP address of the sending device (the image processing device 200 or the user terminal (spoofing-email sending terminal) 370).

In step S816, the user terminal 250 determines whether or not it is possible to extract information about the sending device (the image processing device 200 or the user terminal (spoofing-email sending terminal) 370). If it is possible to extract the information, the process proceeds to step S818; if not, the process ends (the received email is determined to be a spoofing email and a warning is displayed (step S898)). In the description in a template of an email sent from the image processing device 200, for example, the name of the sending device, the location of the sending device, and the like are described following character strings "Device Name:", "Device Location:", and the like. It is sufficient to determine whether or not it is possible to extract such information.

In step S818, the extracted information is checked against email address information (the email-sending-device table 1200, which is a whitelist, in the transmitter-identifier storing module 290) that is set (stored) in advance in the user terminal 250. If the extracted information is included in the address information (the whitelist), the process proceeds to step S820; if not, the process ends (it is determined that the received email is a spoofing email, and a warning is displayed (step S897)).

In step S820, the user terminal 250 sends an email for a transmission check request or transmits a signal for a transmission check request to the IP address of the sending device. The transmission check request includes a document ID.

In step S822, the user terminal 250 sends the email for a transmission check request to the image processing device 200.

In step S824, the user terminal 250 sends the email for a transmission check request to the user terminal (spoofing-email sending terminal) 370.

In step S826, the user terminal 250 waits for a transmission check response from the sending device.

Upon reception of a transmission check request, in step S828, the image processing device 200 determines, by referring to the transmission history, whether or not the document ID in the transmission check request has been transmitted. If the document ID has been transmitted, the image processing device 200 transmits as a reply a transmission check response indicating that transmission has occurred; if not, the image processing device 200 transmits as a reply a transmission check response indicating that transmission has not occurred.

In step S830, the image processing device 200 transmits a transmission check response to the user terminal 250.

In the case of a spoofing email, in step S832, a transmission check response is not obtained as a reply or a proper response is not obtained as a reply. The expression "proper response is not obtained" means the case where a transmission check response indicating that transmission has occurred or a transmission check response indicating that transmission has not occurred is not obtained.

In step S834, the user terminal 250 determines whether or not the transmission check response indicating that transmission has occurred has been obtained. If the transmission check response indicating that transmission has occurred is obtained, the process proceeds to step S836; if not, the process proceeds to step S838.

In step S836, the user terminal 250 determines that the received email is not a spoofing email and performs a normal email displaying process.

In step S838, the user terminal 250 determines that the received email is a spoofing email, displays a warning, and does not open an attached file.

According to the exemplary embodiment, even if the received email is a spoofing email sent from an existent sending device or a spoofing email including, in the trace information, the same character string as that of the domain name of the email address of the sending device, the received information is detectable as a spoofing email.

An exemplary hardware configuration of the information processing device according to the exemplary embodiment will be described with reference to FIG. 15. The configuration illustrated in FIG. 15 is an exemplary hardware configuration that is realized by, for example, a personal computer (PC) and that includes a data reading unit 1517, such as a scanner, and a data output unit 1518, such as a printer.

A central processing unit (CPU) 1501 is a control unit that executes processes in accordance with computer programs that describe sequences of executing the modules described above in the exemplary embodiment, in other words, the following modules: the transmission check process module 110, the transmission-check-request receiving module 115, the checking module 120, the check-result transmitting module 125, the communication module 130, the transmission check process module 155, the extraction module 160, the transmission-check-request transmitting module 165, the check-result receiving module 170, the transmission checking module 175, the presentation module 180, the communication module 185, the image receiving module 235, the email sending module 240, the email receiving module 260, and the like.

A read only memory (ROM) 1502 stores programs, operating parameters, and the like used by the CPU 1501. A random access memory (RAM) 1503 stores programs used in the execution of the CPU 1501, parameters that change appropriately in the execution, and the like. The CPU 1501, the ROM 1502, and the RAM 1503 are connected to one another via a host bus 1504, such as a CPU bus.

The host bus 1504 is connected to an external bus 1506, such as a peripheral component interconnect/interface (PCI) bus, via a bridge 1505.

A keyboard 1508 and a pointing device 1509, such as a mouse, are devices manipulated by an operator. A display 1510, such as a liquid crystal display device or a cathode ray tube (CRT), displays various kinds of information as text or image information.

A hard disk drive (HDD) 1511 includes a built-in hard disk (a flash memory or the like is also possible) and drives and causes the hard disk to record or reproduce information and programs executed by the CPU 1501. The hard disk realizes the functions of the transmission-history storing module 105, the authorized-user storing module 220, the transmitter-identifier storing module 290, the rejected-email-address storing module 295, and the like. Furthermore, the hard disk also stores other various kinds of data, various computer programs, and the like.

A drive 1512 reads data or programs recorded on a removable recording medium 1513, such as a loaded magnetic disk, optical disc, magneto-optical disk, or semiconductor memory, and supplies the data or programs to the RAM 1503 connected to the drive 1512 via an interface 1507, the external bus 1506, the bridge 1505, and the host bus 1504. Note that the removable recording medium 1513 is also usable as a data recording region.

A connection port 1514 is a port to be connected to an external connection device 1515 and includes a connection portion for a USB or IEEE 1394 connector, for example. The connection port 1514 is connected to, for example, the CPU 1501 via the interface 1507, the external bus 1506, the bridge 1505, the host bus 1504, and the like. A communication unit 1516 is connected to a communication line and executes data communication processes with external devices. The data reading unit 1517 is a scanner, for example, and executes a document reading process. The data output unit 1518 is a printer, for example, and performs a document data output process.

The hardware configuration of the information processing device illustrated in FIG. 15 is one of exemplary configurations. The exemplary embodiment is not limited to the configuration illustrated in FIG. 15 and may be any configuration as long as it is possible to execute the modules described in the exemplary embodiment. For example, some modules may be configured by dedicated hardware (e.g., application specific integrated circuit (ASIC)), some modules may be included in an external system and may be connected to the information processing device via a communication line, and plural systems illustrated in FIG. 15 may be connected to one another via a communication line and may operate in cooperation with one another. In particular, some modules may be incorporated in, not only a personal computer, but also a mobile information communication device (e.g., a cell phone, a smartphone, a mobile device, or a wearable computer), a home information appliance, a robot, a copying machine, a facsimile, a scanner, a printer, a multifunction peripheral, and the like.

The above-described program may be provided by being stored in a recording medium. Alternatively, the program may be provided by using a communication unit. In such a case, for example, the program may correspond to a computer readable recording medium storing a program.

The term "computer readable recording medium storing a program" refers to a computer readable recording medium that stores a program and that is used to, for example, install, execute, and distribute the program.

Examples of the recording medium include the following: a digital versatile disc (DVD), such as "DVD-R, DVD-RW, DVD-RAM, and the like" as standardized by the DVD Forum or "DVD+R, DVD+RW, and the like" as standardized by the DVD+RW Alliance; a compact disc (CD), such as a CD read only memory (CD-ROM), a CD recordable (CD-R), or a CD rewritable (CD-RW); a Blu-ray Disc (registered trademark); a magneto-optical disk (MO); a flexible disk (FD); a magnetic tape; a hard disk; a read only memory (ROM); an electrically erasable programmable read only memory (EEPROM) (registered trademark); a flash memory; a random access memory (RAM); and a secure digital (SD) memory card.

A part or all of the program may be, for example, recorded on the recording medium and stored or distributed. Alternatively, a part or all of the program may be transmitted by communication using a transmission medium, such as a wired network used for a local area network (LAN), a metropolitan area network (MAN), a wired area network (WAN), the Internet, an intranet, or an extranet; a wireless communication network; or a combination thereof. Further alternatively, a part or all of the program may be transmitted on a carrier wave.

The above-described program may be a part or all of another program, or may be recorded on a recording medium together with another program. The program may be divided into sub-parts and recorded on plural recording media. The program may be recorded in any form, such as by being compressed or encrypted, as long as it is possible to restore the program.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
at least one processor configured to implement:
an email transmission unit that generates an information identifier, the information identifier being at least one of a value of a hash function applied to the information transmitted in the email, a hash function applied to information attached to the email, or a serial number indicating a transmission order of the email based on a plurality of emails to be transmitted, and transmits, to an external device, an email with an attached image and the information identifier;
a memory that stores a transmission history including the information identifier of information indicating that the email has been transmitted to the external device;
a transmission unit that receives a transmission-check request including transmission-check-request information including the information identifier from the external device, and transmits, to the external device, transmission-check-response information indicating that transmission has occurred if the transmission history includes the information identifier included in transmission-check-request information received from the external device.

2. The information processing device according to claim 1 wherein, if the transmission history does not include the information identifier, the transmission unit transmits, to the external device, transmission-check-response information indicating that transmission has not occurred.

3. The information processing device according to claim 1, wherein the information processing device notifies a predetermined person of user information of a user who has asked for the transmission history.

4. The information processing device according to claim 1, wherein, if the information processing device receives transmission-check-request information from a user who is not authorized to ask for the transmission history, the information processing device rejects a transmission check request.

5. The information processing device according to claim 1, wherein the information identifier included in transmission-check-request information includes any one or more of the image, a part of the image, and a value obtained by applying a function to the image.

6. An information processing device comprising:
at least one processor configured to implement:
an email receiving unit that receives an email with an attached image and an information identifier, the information identifier is generated by a sender of the email and is at least one of a value of a hash function applied to the information transmitted in the email, a hash function applied to information attached to the email, or a serial number indicating a transmission order of a plurality of emails to be transmitted;
an extraction unit that extracts the information identifier and a transmitter identifier from information indicating that the email has been received;
a transmission unit that transmits transmission-check-request information including the information identifier to the sender of the email indicated by the transmitter identifier; and
a presentation controller that causes a warning to be presented if, from the email sending device, the information processing device receives transmission-check-response information indicating that transmission has not occurred or does not receive, within a predetermined period, transmission-check-response information indicating that transmission has occurred.

7. The information processing device according to claim 6, further comprising:
a transmitter-identifier-table memory that stores a transmitter-identifier table,
wherein, if the transmitter-identifier table does not include the transmitter identifier, the presentation controller is caused to present a warning.

8. The information processing device according to claim 6, wherein, if the information processing device receives transmission-check-response information indicating that transmission has not occurred or does not receive, within a predetermined period, transmission-check-response information indicating that transmission has occurred, the information processing device performs any one or more of adding, to a rejection list, an email address of a sender of the information indicating that the email has been received, notifying a predetermined manager, running a virus scanner on the information indicating that the email has been received, and deleting the information indicating that the email has been received.

9. The information processing device according to claim 6, wherein, if the information indicating that the email has been received does not include a specific description, the transmission unit does not transmit the transmission-check-request information.

10. The information processing device according to claim 6, wherein the information identifier included in transmission-check-request information includes any one or more of the image, a part of the image, and a value obtained by applying a function to the image.

11. The information processing device according to claim 6, wherein the transmitter identifier is an IP address of the email sending device extracted from the received email.

12. An information processing system comprising:
a first information processing device that transmits information; and
a second information processing device that receives the information,
wherein the first information processing device includes at least one processor configured to implement:
an email transmission unit that generates an information identifier that is at least one of a value of a hash function applied to the information transmitted in the email, a hash function applied to information attached to the email, or a serial number indicating a transmission order of the email based on a plurality of emails to be transmitted, and transmits, to the second information processing device, an email with an attached image and the information identifier,
a memory that stores a transmission history including the information identifier of information indicating that the email has been transmitted to the second information processing device, and
a transmission unit that receives a transmission-check request including transmission-check-request information including the information identifier from the second information processing device, and transmits, to the second information processing device, transmission-check-response information indicating that transmission has occurred if the transmission history includes the information identifier included in transmission-check-request information received from the second information processing device, and
wherein the second information processing device includes at least one processor configured to implement:
an email receiving unit that receives an email with an attached image from the first information processing device,
an extraction unit that extracts the information identifier and a transmitter identifier from information indicating that the email has been received,
a transmission unit that transmits, to the first information processing device indicated by the transmitter identifier, and the transmission-check-request information including the information identifier, and receives from the first information processing device the transmission-check-response information
a presentation controller that causes a warning to be presented if, from the first information processing device, the second information processing device receives the transmission-check-response information indicating that transmission has not occurred or does not receive, within a predetermined period, the transmission-check-response information indicating that transmission has occurred.

13. A non-transitory computer readable medium storing a program causing a computer to execute a process comprising:
- generating an information identifier based on an email to be transmitted, the information identifier being at least one of a value of a hash function applied to the information transmitted in the email, a hash function applied to information attached to the email, or a serial number indicating a transmission order of the email based on a plurality of emails to be transmitted;
- transmitting the email with an attached image and the information identifier to an external device;
- storing a transmission history including the information identifier of information indicating that the email has been transmitted to the external device;
- receiving a transmission-check request including transmission-check-request information including the information identifier from the external device; and
- transmitting, to an external device, transmission-check-response information indicating that transmission has occurred if the transmission history includes the information identifier included in transmission-check-request information received from the external device.

14. A non-transitory computer readable medium storing a program causing a computer to execute a process comprising:
- receiving an email with an attached image and an information identifier, the information identifier is generated by a sender of the email and is at least one of a value of a hash function applied to the information transmitted in the email, a hash function applied to information attached to the email, or a serial number indicating a transmission order of the email based on a plurality of emails to be transmitted;
- extracting the information identifier and a transmitter identifier from information indicating that the email has been received;
- transmitting transmission-check-request information including the information identifier to a sending device indicated by the transmitter identifier; and
- causing a warning to be presented if transmission-check-response information indicating that transmission has not occurred is received from the sending device or if, within a predetermined period, transmission-check-response information indicating that transmission has occurred is not received from the sender of the email.

15. A non-transitory computer readable medium storing a program causing a computer of a system to execute a process, the system including a first information processing device that transmits information and a second information processing device that receives the information, the process comprising:
- generating an information identifier based on an email to be transmitted, the information identifier is at least one of a value of a hash function applied to the information transmitted in the email, a hash function applied to information attached to the email, or a serial number indicating a transmission order of the email based on a plurality of emails to be transmitted;
- transmitting, from the first information processing device to the second information processing device, the email with an attached image and the information identifier;
- storing, in the first information processing device, a transmission history including the information identifier of information indicating that the email has been transmitted to the second information processing device;
- receiving, from the first information processing device to the second information processing device, an email with an attached image;
- extracting, in the second information processing device, the information identifier and a transmitter identifier from information indicating that the email has been received;
- transmitting, from the second information processing device to the first information processing device, a transmission-check request including transmission-check-request information including the information identifier from the first information processing device;
- transmitting, in response to receiving the transmission-check request, from the first information processing device to the second information processing device, transmission-check-response information indicating that transmission has occurred if the transmission history includes the information identifier included in transmission-check-request information received from the second information processing device; and
- causing, in the second information processing device, a warning to be presented if transmission-check-response information indicating that transmission has not occurred is received from the first information processing device or if, within a predetermined period, transmission-check-response information indicating that transmission has occurred is not received from the first information processing device.

* * * * *